United States Patent
Wang (10) Patent No.: US 12,485,510 B1
(45) Date of Patent: Dec. 2, 2025

(54) INDEXING ROUTER BASE

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 19/240,747

(22) Filed: Jun. 17, 2025

(51) Int. Cl.
*B23Q 9/00* (2006.01)
*B27C 5/10* (2006.01)

(52) U.S. Cl.
CPC .............. *B23Q 9/0028* (2013.01); *B27C 5/10* (2013.01)

(58) Field of Classification Search
CPC ...... B27C 5/10; B27F 1/02; B27F 1/04; B27F 1/08; B27F 1/16; B23Q 9/0007; B23Q 9/0014

See application file for complete search history.

(56) References Cited

U.S. PATENT DOCUMENTS

| | | |
|---|---|---|
| 1,904,109 A | 4/1933 | Wendorf |
| 4,197,887 A | 4/1980 | Groves |
| 4,763,707 A | 8/1988 | Hounshell |
| 4,777,991 A | 10/1988 | Adame |
| RE33,045 E | 9/1989 | Gronholz et al. |
| 4,977,938 A | 12/1990 | Greeson |
| 5,183,373 A | 2/1993 | Floyd, Jr. |
| 5,285,831 A | 2/1994 | Woolgar |
| 5,289,861 A | 3/1994 | Hedrick |
| 5,452,751 A | 9/1995 | Engler, III et al. |
| 5,685,675 A | 11/1997 | Beekman |
| 5,758,702 A | 6/1998 | Adams |
| 7,337,812 B2 | 3/2008 | Williams |
| 7,363,950 B2 * | 4/2008 | Wielechowski .......... B27C 5/10 144/136.95 |
| 8,109,304 B2 * | 2/2012 | Alves ........................ B27C 5/10 144/144.1 |
| 10,603,754 B2 * | 3/2020 | Witter ................ B23Q 11/0046 |
| 11,358,300 B2 * | 6/2022 | Grove .................. B23Q 9/0028 |
| 11,833,634 B2 | 12/2023 | Urig |
| 2006/0032553 A1 | 2/2006 | Williams |
| 2006/0086425 A1 | 4/2006 | Hyde |
| 2009/0188584 A1 | 7/2009 | Stepp |
| 2019/0275695 A1 | 9/2019 | Grove |
| 2022/0395950 A1 | 12/2022 | Urig |
| 2025/0153291 A1 * | 5/2025 | Babayev ................... B27C 5/10 |

* cited by examiner

*Primary Examiner* — Matthew Katcoff
(74) *Attorney, Agent, or Firm* — Wolter Van Dyke Davis, PLLC; Robert L. Wolter; Patrick Herron (57) ABSTRACT

An indexing router base (100), includes a main body (102). The main body includes: an upper surface (110) and a lower surface (112); a central opening (114) through the main body; a raised guide ring (116) that protrudes upward from the upper surface and that surrounds the central opening; and a linear cleat (118) that protrudes downward from the lower surface, that is set apart from a center (114C) of the central opening, and that defines a long axis (118L) that is perpendicular to a radial line (124) originating at the center of the central opening.

18 Claims, 7 Drawing Sheets

INDEXING ROUTER BASE

FIELD OF THE INVENTION

The invention relates to a router base configured to index a slot cut using a previously cut slot as a reference.

BACKGROUND OF THE INVENTION

Conventional routing techniques include placing a template atop a workpiece, where the edge of the template matches a shape to be routed into the workpiece but is set back from the edge of the workpiece. The router includes a base plate that rests atop the template. The base plate is configured to receive a guide bushing. The guide bushing includes a hollow guide cylinder that protrudes downward from the base plate. A router bit passes through the hollow guide cylinder to be adjacent the edge of the workpiece while an outside edge of the hollow cylinder is adjacent an edge of the template. The outside edge of the hollow guide cylinder moves along the edge of the template and this guides the router bit as the router bit cuts the same profile in the workpiece.

There exist a variety of guide bushings that have hollow guide cylinders of various internal and external diameters to accommodate router bits of differing diameters. Example guide bushings include the Templet Guide Kit manufactured by Porter-Cable® of Jackson TN. These are designed to work with a Porter-Cable® router base plate. Base plate adapters are also available to enable use of the Porter-Cable® guide bushings with bases of routers originally manufactured with base plates that are not compatible with the Porter-Cable® guide bushings. The Porter-Cable® guide bushings and the associated base plates are ubiquitous in the woodworking industry.

However, such guide bushings rely on the operator to ensure the outer diameter of the hollow guide cylinder remains against the edge of the workpiece. Moreover, accurate cuts in the workpiece rely on accurate positioning of the template as well as the template not moving during the routing operation. Consequently, there is room in the art for improvement.

BRIEF DESCRIPTION OF THE DRAWINGS

The invention is explained in the following description in view of the following drawings.

DETAILED DESCRIPTION OF THE INVENTION

Various embodiments may be understood more readily by reference to the following detailed description. Unless defined otherwise, all technical and scientific terms used herein have the same meaning as commonly understood by one of ordinary skill in the art to which this disclosure belongs.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The present inventors have recognized that the conventional routing technique using the guide bushings allows for unwanted variation in certain routing operations. An example of such a routing operation is routing a first array of slots in a workpiece, where the slots are at the same distance from and parallel to each other. Another example is routing a second array of slots that are parallel to each other and transverse at consistent angles to the slots in the first array of slots. In an example embodiment, the slots of the first array can be perpendicular to the slots of the second array, although this is not necessary. The slots may be any shape, including dovetail.

The present inventors have devised a unique and innovative indexing router base that is configured to create arrays of parallel slots in workpieces, where the slots are the same distance apart and intersecting slots are disposed at consistent angles to each other.

The indexing router base is further configured to cooperate with the ubiquitous router base plates that are compatible with the Porter-Cable® guide bushings. This compatibility enables many users to incorporate the indexing router base directly into their router operations without having to purchase any additional components.

Moreover, while the various adapter plates in the industry have different hole patterns to enable mounting on the respective router, the indexing router base disclosed herein includes universal and adjustable clamp assemblies that enable the indexing router base to be secured to most routers.

Figure 1:
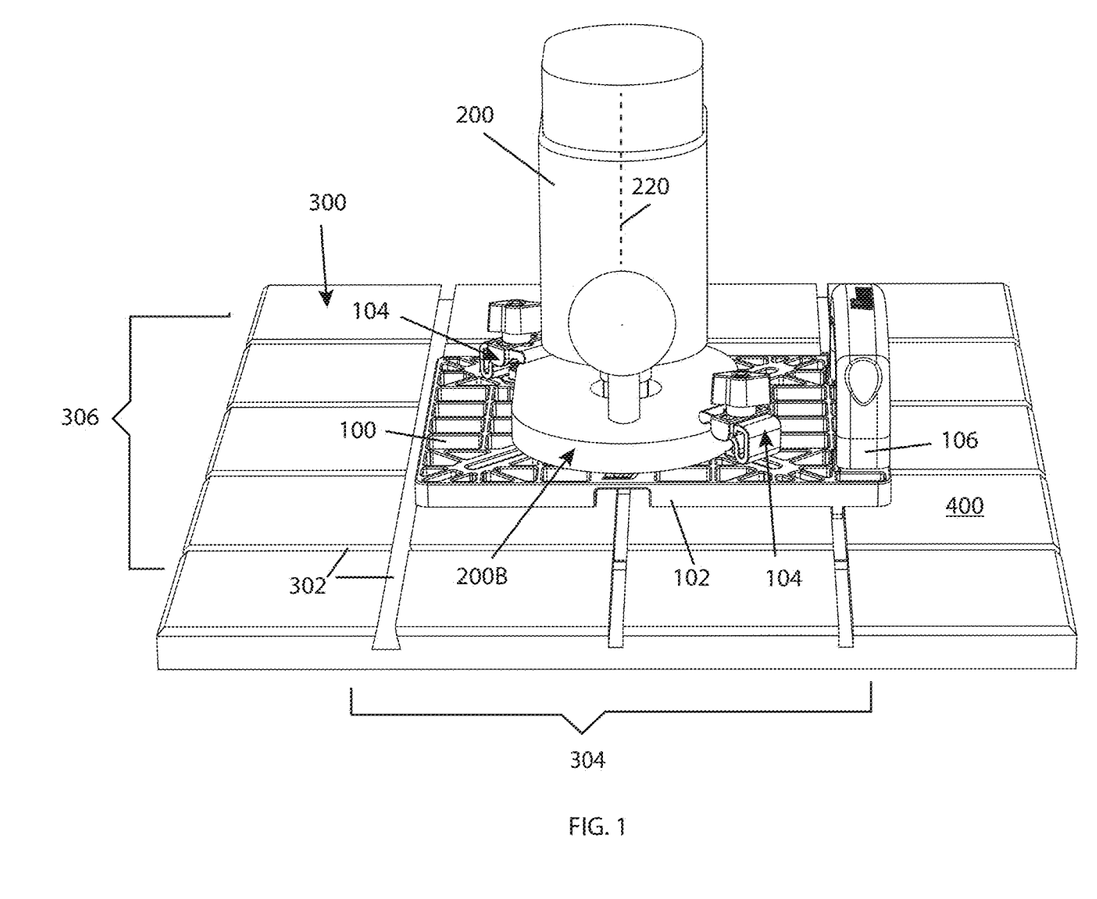
FIG. 1 shows an example embodiment of an indexing router base forming dovetail slots in a workpiece.
Figure 2:
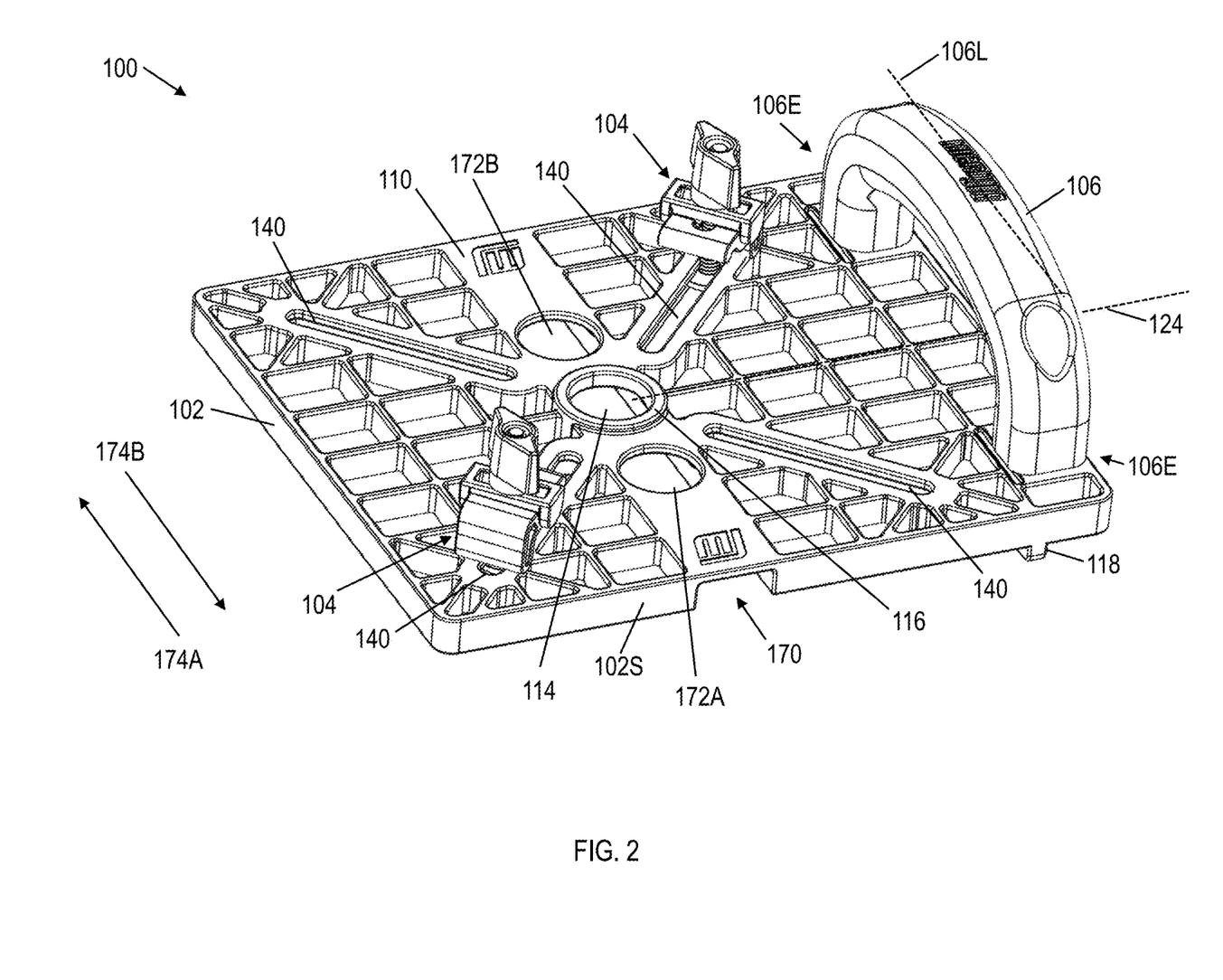
FIG. 2 is a perspective view of the indexing router base of FIG. 1.

FIG. 1 shows an example embodiment of an indexing router base 100 and a router 200 forming a grid 300 of dovetail slots 302 in a workpiece 400. The grid 300 include a first array 304 of dovetail slots 302 and a second array 306 of dovetail slots 302, where the slots 302 in the first array 304 are disposed transverse (e.g., perpendicular) to the slots 302 in the second array 306.

FIG. 2-5 are various views of the indexing router base 100 of FIG. 1. The indexing router base 100 includes a main body 102, and universal clamp assemblies 104 and a handle 106 secured to the main body 102.

The main body 102 includes an upper surface 110, a lower surface 112, central opening 114 through the main body 102, a raised guide ring 116 that protrudes upward from the upper surface 110 and that surrounds the central opening 114, and a cleat 118 (e.g., a linear cleat). The upper surface 110 and/or the lower surface 112 may be continuous or may be defined by multiple flat areas that collectively define a plane (as shown).

The router 200 includes a router base 200B and a base plate 202 that is configured to work with Porter-Cable® guide bushings. (The base plate 202 is shown separated from the router base 200B in FIG. 5.) The base plate 202 includes a base plate opening 204 having a first diameter 206 and a second diameter 208. The raised guide ring 116 defines an outer diameter 120 that is configured to cooperate with the first diameter 206 such that the raised guide ring 116 fits snugly in the base plate opening 204. The snug fit is a slip fit with as little difference between the first diameter 206 and the outer diameter 120 as manufacturing reasonably permits. In an example embodiment, the outer diameter 120 is 1.36". This arrangement positions the raised guide ring 116 concentric with the base plate opening 204 and thereby concentric with an axis of rotation 220 of a router bit 222. In an example embodiment, the raised guide ring 116 protrudes from the upper surface 110 by a guide ring height 122 of not more than 0.094".

Figure 5:
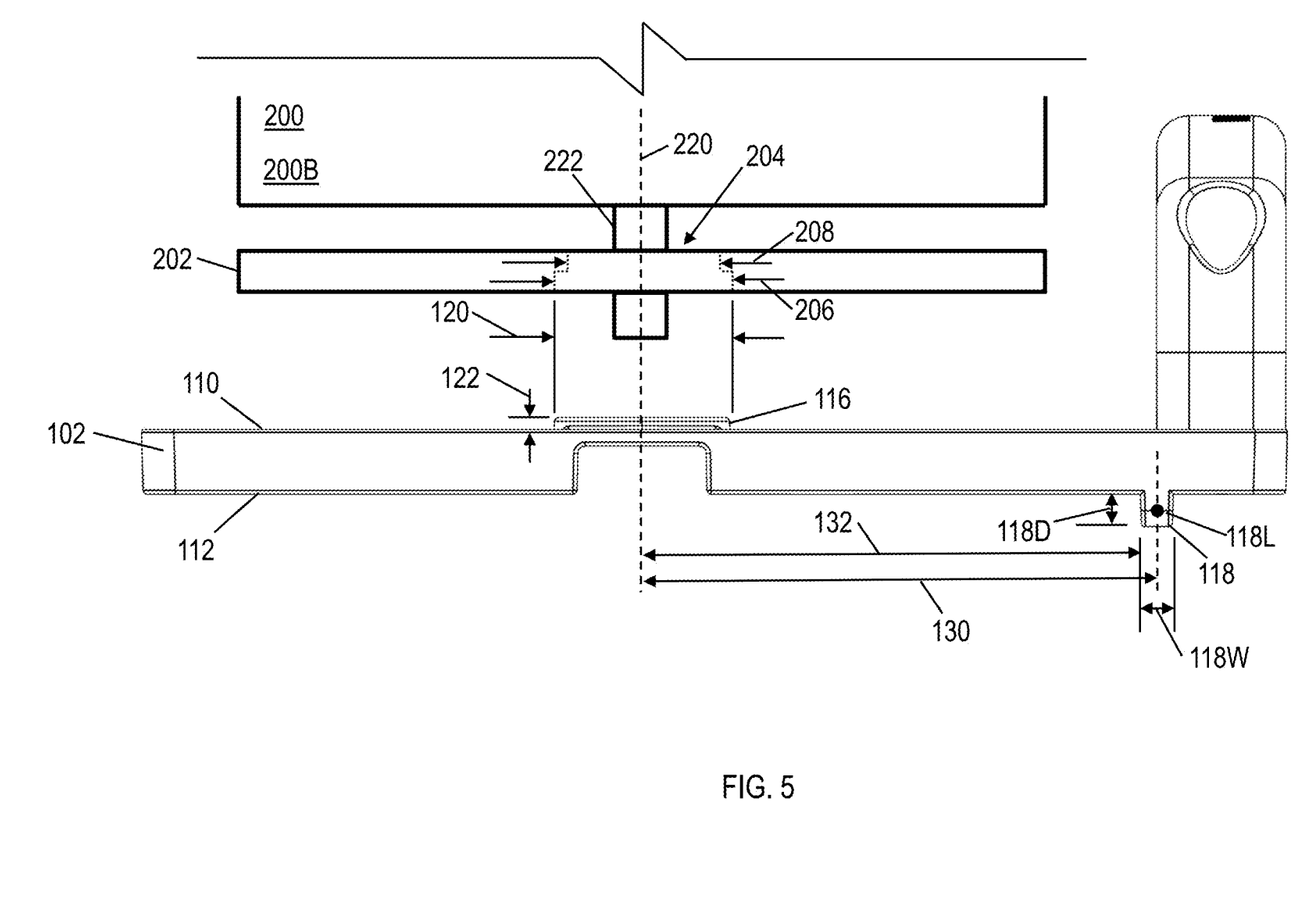
FIG. 5 is an expanded side view of the main body of the indexing router base, a schematic representation of an adapter plate, and a schematic representation of a router.

The central opening 114 of the main body 102 aligns with the raised guide ring 116 to the extent that a router bit (not shown) can pass through the raised guide ring 116 and through the central opening 114. In an example embodiment, the central opening 114 is concentric with the raised guide ring 116 and is therefore concentric with the axis of rotation 220. In that example embodiment, the axis of rotation 220 intersects a center 114C of the central opening 114.

Figure 4:
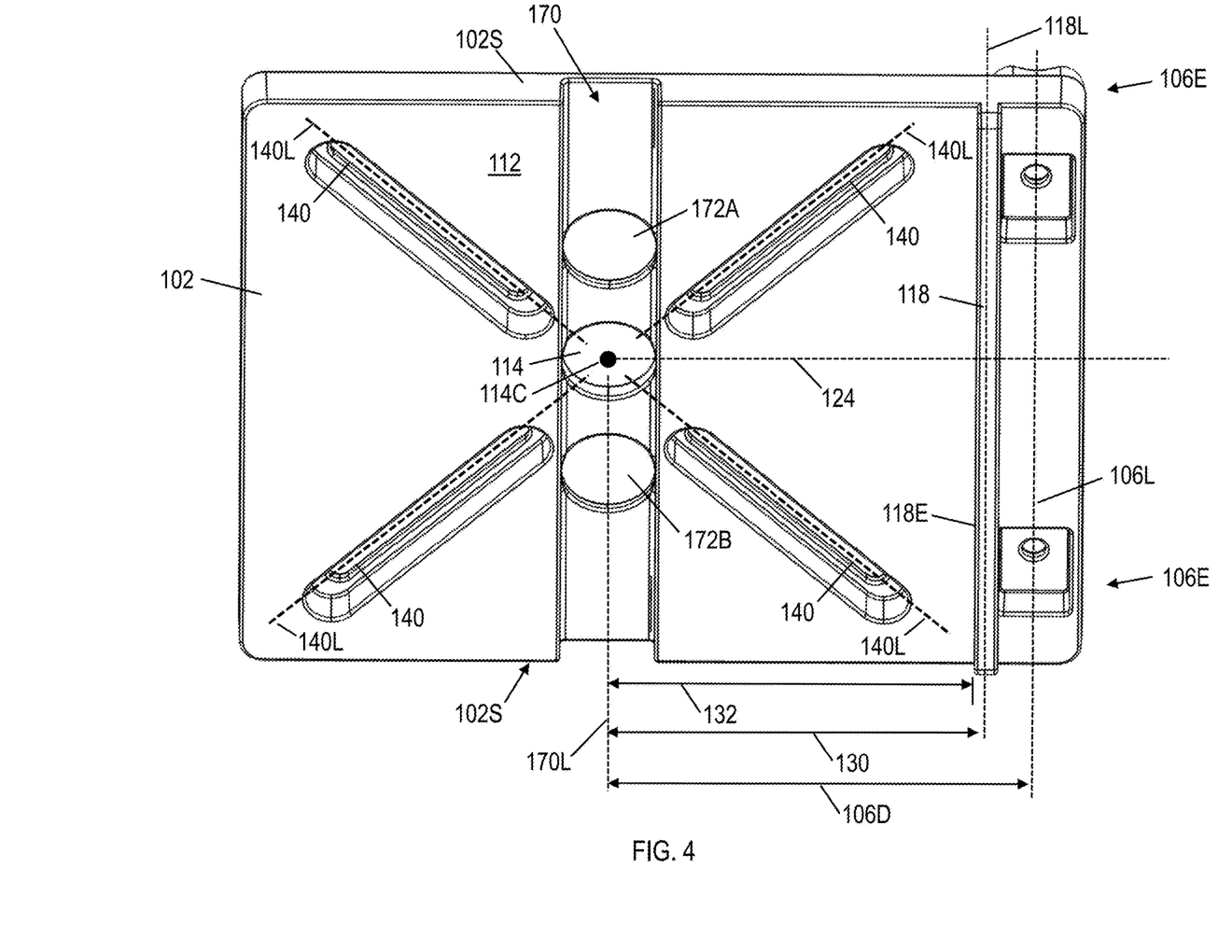
FIG. 4 is a lower perspective view of the main body of the indexing router base of FIG. 1.

The cleat 118 defines a long axis 118L that is perpendicular to a radial line 124 originating at the center 114C of the central opening 114. The long axis 118L of the cleat 118 is set apart from the center 114C by a distance 130. An inside edge 118E (e.g., a left edge as seen in FIG. 4) of the cleat 118 is parallel to the long axis 118L and is set apart from the center 114C of the central opening 114 by a distance 132.

In an example embodiment disclosed below, distance 130 will be a distance between centers of adjacent slots 302 formed by the indexing router base 100. The distance 130 can be set to any magnitude. In an example embodiment, the distance 130 is set at four inches (4"). This coincides with a recommended distance for the Matchfit® line of products manufactured by MicroJig® of Winter Park, FL. In an example embodiment, the cleat 118 protrudes from the lower surface 112 by a cleat protrusion distance 118D of not more than 0.25" and defines a cleat width 118W of 0.25". The limited cleat protrusion distance 118D allows room for dust as is described below. In this example embodiment, the cleat width 118W coincides with a width of a ¼" relief pass router bit that is used as detailed below.

In an example embodiment, the location of the cleat 118 is not adjustable. In particular, the distance 130 cannot be adjusted. In an example embodiment, the main body 102 and the cleat 118 are formed from a unipartite body. A unipartite body may be formed via a molding/casting process, it may be machined from a blank, or it may be 3D printed etc. In an example embodiment, the main body 102, the cleat 118, and the raised guide ring 116 are formed from a unipartite body. Using a (nonadjustable) unipartite body ensures that the distanced 130, 132 are exactly the same every time which, in turn, ensures a distance between adjacent slots 302 is exactly the same every time, as described below.

The main body 102 further includes an array (e.g., an annular array) of radially oriented slits 140 surrounding the central opening 114. Long axes 140L of the slits 140 may or may not also coincide with radial lines originating at the center 114C of the central opening 114.

Figure 3:
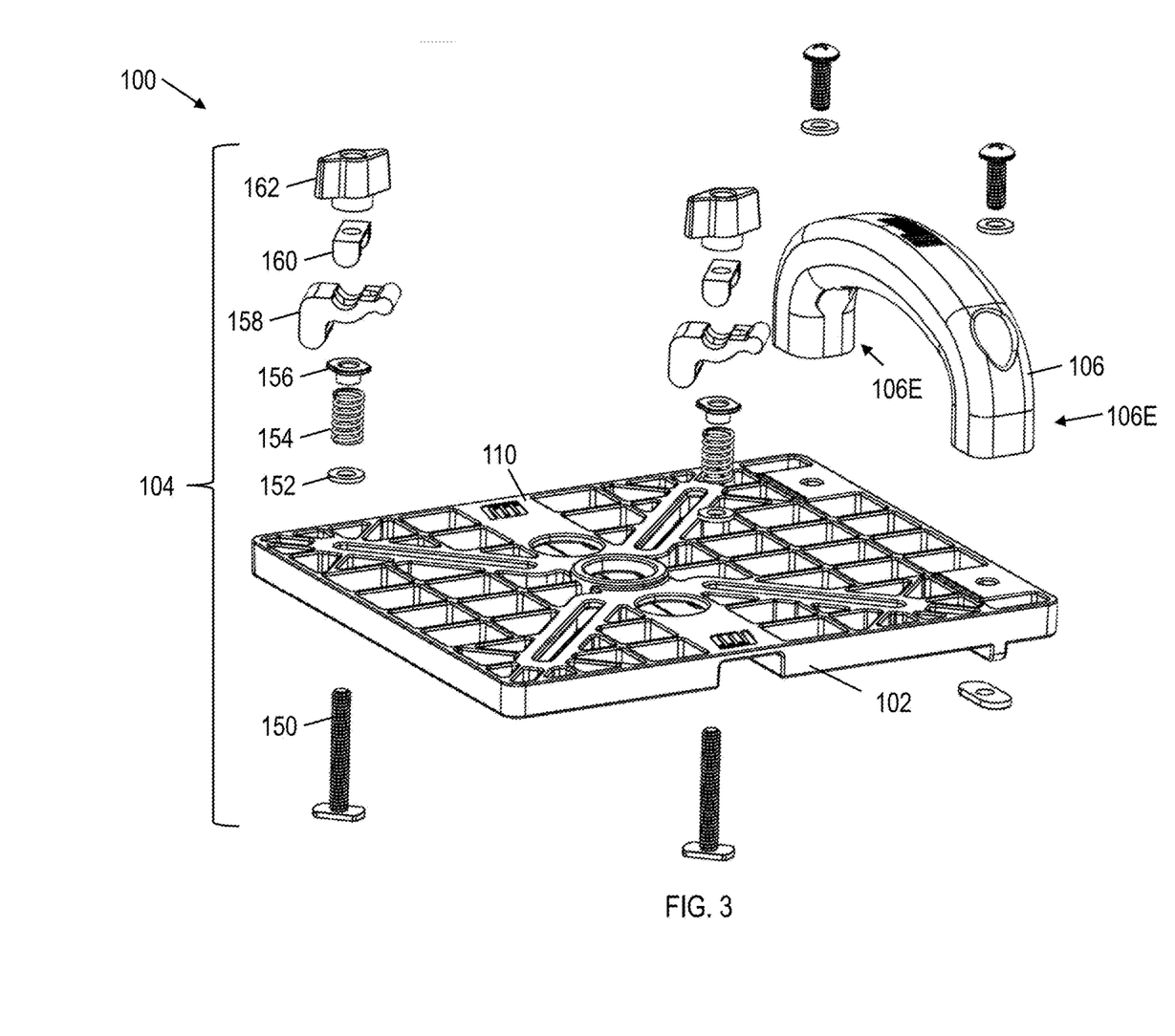
FIG. 3 is an expanded view showing the components of the indexing router base of FIG. 1.

Each clamp assembly 104 is configured to cooperate with a respective slit 140 to clamp the router to the main body 102. Each clamp assembly 104 includes a T-bolt 150 that protrudes upward through and rides along the slot 140, a washer 152 that rests on the upper surface 110, a compression spring 154 that spreads the clamp assembly 104 apart (which aids manipulation of the clamp assembly 104), a shoulder washer 156 that centers the compression spring 154 and that provides a smooth surface against which a clamp 158 can pivot, a clamp pivot 160 that centers and aids in the pivoting action of the clamp 158, and a handle 162 with an incorporated nut (not visible) that tightens and loosens the clamp assembly 104.

As can be seen in FIG. 1, the clamp assembly 104 clamps over/onto a router base 200B of the router 200. This securing technique avoids the need to attach the indexing router base 100 via fasteners. This is advantageous because it avoids the need to match fastener hole patterns in the various router bases. Moreover, this allows the router 200 to be rotationally positioned in any clocking position about the axis of rotation 220 of the router bit. Some routers have handles incorporated into them. For those configurations, the freedom to choose any clocking position allows a user to choose a preferred clocking position that places the incorporated router handles in a preferred position.

The handle 106 is secured to the main body 102 via conventional fasteners, is set apart from the center 114C of the central opening 114, and ends 106E of the handle 106 straddle the radial line 124 when viewed from above (and below). In an example embodiment, a long axis 106L of the handle 106 is transverse to the radial line 124. In an example embodiment, the long axis 106L is perpendicular to the radial line 124. In an example embodiment, a distance 106D from the center 114C to the long axis 106L is at least as great as the distance 130. Orienting the handle 106 transverse to the radial line 124, at least partly aligns the handle with either direction of travel 174A, 174B used during the routing operation, which aids in movement of the indexing router base 100.

The main body 102 further includes a dust groove 170 that is recessed into the lower surface 112 and that defines a long axis 170L that is oriented parallel to the long axis 118L of the cleat 118. The central opening 114 opens into the dust groove 170. The dust groove 170 provides a way for sawdust generated by the routing operation to evacuate the area of the cutting edge of the router bit. This, in turn, prevents a buildup of sawdust at the cutting edge of the router bit and the associated negative effects thereof. The dust groove 170 extends all the way through the main body 102 such that it is open to the surrounding atmosphere through sides 102S of the main body.

The main body 102 further includes a pair of dust extraction openings 172A, 172B that straddle the central opening 114 and that pass fully through the main body 102 from the upper surface 110 to the dust groove 170. Dust typically accumulates behind the router bit with respect to the direction of travel 174A, 174B of the router bit. Having a dust extraction opening 172A, 172B on both sides of the central opening 114 allows for efficient dust extraction regardless of the direction of travel 174A, 174B in which the router bit, and hence the indexing router base 100, are moving. For example, when the indexing router base 100 is moving in direction 174A, dust extraction opening 172A will catch sawdust behind the router bit. Similarly, when the indexing router base 100 is moving in direction 174B, dust extraction opening 172B will catch sawdust behind the router bit. The dust extraction openings 172A, 172B are configured to work with existing conventional dust extraction equipment.

FIG. 6A to 6D illustrate forming relief slots 302R (302R-A, 302R-B, 302R-C) in the workpiece 400 prior to forming the dovetail slots (or any other shaped slot) as is shown in FIG. 7A to FIG. 7D.

In this example embodiment, a relief router bit 222R having a relief router bit diameter 222D of 0.25" is used. The cleat width 118W may match the relief router bit diameter 222D and therefore also be 0.25". In this scenario, a relief slot width 302RW of the relief slot 302R formed by the relief router but 222R are the same as the cleat width 118W. When the cleat width 118W is the same as the relief router bit diameter 222D, the cleat 118 fits snugly in the relief slot 302R formed by the relief router bit 222R. This snug fit ensures the next relief slot 302R that is formed remains straight and parallel to the previously formed relief slot 302R that guides the cleat 118. However, it is not necessary for the cleat width 118W to be the same as the relief router bit diameter 222D.

In an example embodiment, the relief router bit 222R is set to protrude past the lower surface 112 by a distance that is greater than the cleat protrusion distance 118D. In an example embodiment, when the cleat protrusion distance 118D is 0.25", the relief router bit 222R may be set to protrude 11/32" from the lower surface 112. This leaves a clearance 302C between the bottom of the relief router bit 222R and the bottom of the relief slot 302R to accommodate any accumulated sawdust.

Figures 6A, 6B, 6C:
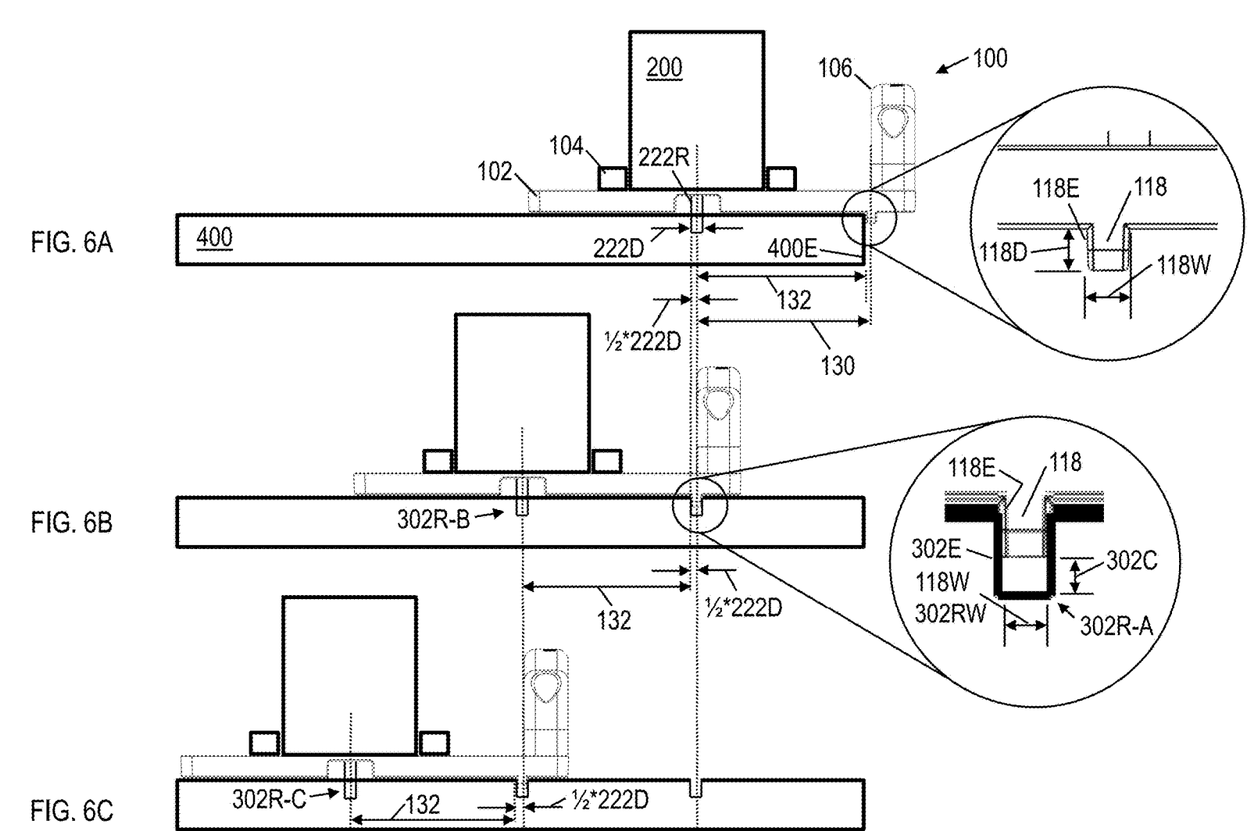
FIG. 6A to FIG. 6D schematically show the formation of relief slots using the indexing router base of FIG. 1.
Figure 6D:
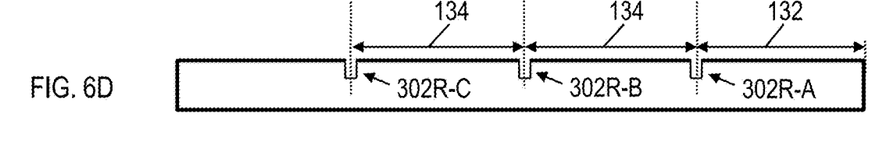

Relief slot 302R-A is formed in FIG. 6A. Because the inside edge 118E of the cleat 118 uses the edge 400E of the workpiece 400 as the reference, and because the distance 132 is from the inside edge 118E of the cleat 118 to the axis of rotation 220, the relief slot 302R-A is centered at distance 132 from an edge 400E of the workpiece.

Relief slot 302R-B is formed in FIG. 6B using the relief slot 302R-A formed in FIG. 6A as the reference. Here, the inside edge 118E of the cleat 118 uses the left edge 302E (as viewed in FIG. 6A) of the relief slot 302R-A as the reference. The left edge 302E of the relief slot 302R-A is half of the relief router bit diameter 222D to the left of the center of the relief slot 302R-A. Consequently, the relief slot 302R-B being formed in FIG. 6B will be centered at a distance 134 from the relief slot 302R-A, where the distance 134 between the relief slot 302R-A and the relief slot 302R-B is the sum of 1) distance 132 from the inside edge 118E to the axis of rotation 220, and 2) half the relief router bit diameter 222D.

Relief slot 302R-C that is formed in FIG. 6C will also be centered at the distance 134 from the relief slot 302R-B formed in FIG. 6B based on the same geometric principles. Similarly, any more relief slots 302R that are formed beyond the relief slot 302R-C using this process will be centered from its adjacent relief slots by the same distance 134.

When the cleat width 118W is the exact same as the relief router bit diameter 222D, then the distance 130 is the same as distance 134.

When a desired center to center distance 134 is sought, (for example, four inches), and the relief router bit diameter 222D is known, (for example, ½"), the distance 132 can be determined by subtracting one half of the relief router bit diameter 222D from the desired center to center distance. In this example embodiment, distance 132 would be [4"−(½*¼], in which case distance 132=3.875".

To create the finished slots 302 (302-A, 302-B, 302-C), the relief router bit 222R is replaced with a finish router bit 222F. In an example embodiment, the finish router bit 222F is a dovetail router bit. In an example embodiment, the finish router bit 222F is a MatchFit® Dovetail Router Bit manufactured by MicroJig of Winter Springs, FL, which is a ½"-14° dovetail bit. The finish router bit 222F is installed in the router with a ⅜" cutting depth.

The routing operation to create the finished slots 302 is similar to the routing operation to create the relief slots 302R but proceeds in reverse.

The first finished slot 302 to be formed is formed where the last relief slot 302R was formed. This means finished slot 302-C will be formed first and will be centered in the same place the last-cut relief slot 302R-C was centered as viewed in FIG. 6C to FIG. 7D.

Figure 7A:
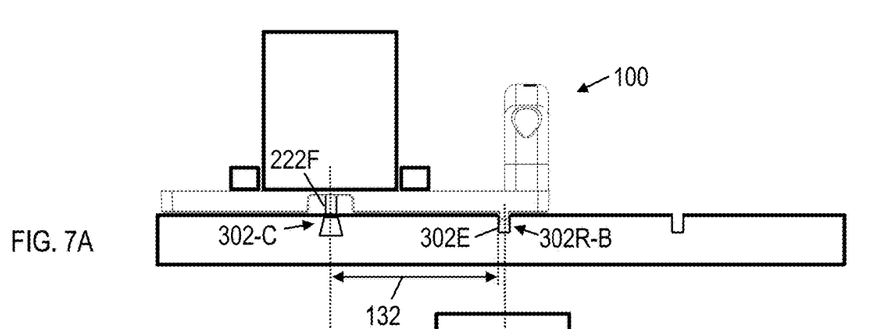
FIG. 7A to FIG. 7D schematically show the formation of finish slots using the indexing router base of FIG. 1.

The finished slot 302-C is formed in FIG. 7A. In this example embodiment where three relief slots 302R-A, 302R-B, 302R-C were formed, the inside edge 118E of the cleat 118 uses the left edge 302E of the relief slot 302R-B as the reference to form the finished slot 302-C. The relief slot 302R-B is used because it is disposed immediately adjacent the last cut/formed relief slot 302R-C.

Since the left edge 302E of the relief slot 302R-B was the reference to the axis of rotation 220 of the relief slot 302R-C, the left edge 302E of the relief slot 302R-B is also the reference to the axis of rotation of the finish router bit 222F. Since the distance 132 from the inside edge 118E of the cleat 118 to the axis of rotation 220 of the indexing router base 100 has not changed, the finished slot 302-C will be centered in the exact same position as was the relief slot 302R-C that it replaces.

Figures 7B, 7C:
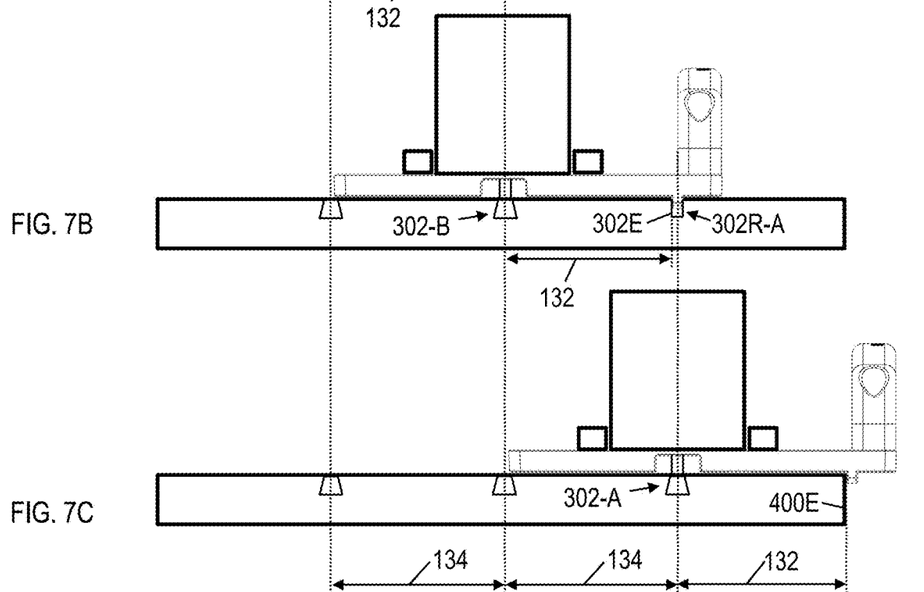
Figure 7D:
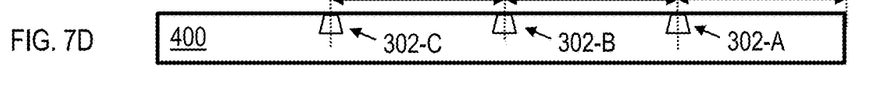

Finished slot 302-B is formed in FIG. 7B. The cleat 118 is placed in the relief slot 302R-A (the next adjacent relief slot 302R). Since the left edge 302E of the relief slot 302R-A was used as the reference to form the relief slot 302R-B, since the left edge 302E of the relief slot 302R-A is also being used as the reference to form the finished slot 302-B, and since distance 132 has not changed, the finished slot 302-B will be centered in the exact same position as was the relief slot 302R-B.

Finished slot 302-A is formed in FIG. 7C. The inside edge 118E of the cleat 118 is placed against the edge 400E of the workpiece 400. Since the edge 400E of the workpiece 400 was used as the reference to form the relief slot 302R-A, since the edge 400E of the workpiece 400 is also being used as the reference to form the finished slot 302-A, and since distance 132 has not changed, the finished slot 302-A will be centered in the exact same position as was the relief slot 302R-A.

The result of the above process is the first array 304 of finished slots 302, all of which are the same distance from each other, and which are nicely parallel, and all of which were easily formed while leaving little room for error. The above process can be repeated to form the second array 306 of transverse slots 302 to create a grid 300 of dovetail slots 302.

If the finished slots 302 were not formed in the reverse order, but instead were formed in the same order as the relief slots 302R were formed, the finished slot 302-A would be centered on the relief slot 302R-A because both would be referenced off the edge 400E of the workpiece 400. However, the finish router bit 222F is wider than the relief router bit 222R. This would move the left edge of the finished slot 302-A to the left (as viewed in FIG. 6A to FIG. 7D) relative to the left edge 302E of the relief slot 302R-A. Since the left edge of the finished slot 302-A would be moved to the left relative to the left edge 302E of the relief slot 302R-A, and since the left edge 302E of the relief slot 302R-A was used as the reference for the location of the relief slot 302R-B, the location of the finished slot 302-B would be different than the location of the relief slot 302R-B. Since the locations of the finished slots 302 need to be the same as the locations of the relief slots 302R, this process would not be suitable.

As has been disclosed above, the present inventor has devised an apparatus with features that are improvements in the art. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An indexing router base, comprising a main body, wherein the main body comprises:
   an upper surface and a lower surface;
   a central opening through the main body;
   a raised guide ring that protrudes upward from the upper surface and that surrounds the central opening;
   a linear cleat that protrudes downward from the lower surface, that is set apart from a center of the central opening, and that defines a long axis that is perpendicular to a radial line originating at the center of the central opening; and
   wherein the main body, the linear cleat, and the raised guide ring are features of a unipartite main body.

2. The indexing router base of claim 1,
   wherein the raised guide ring defines an outer diameter of 1.36".

3. The indexing router base of claim 1,
   wherein the linear cleat protrudes not more than 0.25" from the lower surface.

4. The indexing router base of claim 1,
   wherein a length of the radial line from the central opening to the long axis is 4".

5. The indexing router base of claim 1,
   wherein the main body further comprises an array of slits surrounding the central opening, each slit comprising a respective long axis that is oriented parallel to a respective radial of the center of the central opening.

6. The indexing router base of claim 5,
   further comprising a plurality of clamp assemblies, each clamp assembly of the plurality of clamp assemblies being configured to cooperate with a respective slit of the array of radially oriented slits to clamp a router to the main body.

7. The indexing router base of claim 1,
   wherein the main body further comprises a dust groove that is recessed into the lower surface and that is oriented parallel to the linear cleat; and
   wherein the central opening opens into the dust groove.

8. The indexing router base of claim 7,
   wherein the main body further comprises a pair of dust extraction openings that straddle the central opening and that span from the upper surface to the dust groove.

9. The indexing router base of claim 1,
   further comprising a handle configured to be secured to the upper surface, to be set apart from the center of the central opening, and to straddle the radial line when the indexing router base is viewed from above.

10. An indexing router base, comprising a main body, wherein the main body comprises:
    an upper surface and a lower surface;
    a central opening through the main body; and
    a raised guide ring that protrudes upward from the upper surface, that surrounds the central opening, and that defines an outer diameter of 1.36";
    a linear cleat that protrudes downward from the lower surface, that is set apart from a center of the central opening, and that defines a long axis that is perpendicular to a radial line originating at the center of the central opening; and
    wherein the indexing router base is free of an adjustment feature that would enable movement of the linear cleat relative to the raised guide ring.

11. The indexing router base of claim 10,
    wherein the raised guide ring protrudes not more than 0.094" from the upper surface.

12. An indexing router base, comprising a main body, wherein the main body comprises:
    an upper surface and a lower surface;
    a central opening through the main body;
    a raised guide ring that protrudes upward from the upper surface and that surrounds the central opening;
    a linear cleat that protrudes downward from the lower surface, that is set apart from a center of the central opening, and that defines a long axis that is perpendicular to a radial line originating at the center of the central opening;
    a dust groove that is recessed into the lower surface and that is oriented parallel to the linear cleat, wherein the central opening opens into the dust groove; and
    a handle configured to be secured to the upper surface, to be set apart from the center of the central opening, and to straddle the radial line when the indexing router base is viewed from above.

13. The indexing router base of claim 12,
    wherein the main body further comprises a pair of dust extraction openings that straddle the central opening and that span from the upper surface to the dust groove.

14. The indexing router base of claim 13,
    wherein the main body further comprises an array of radially oriented slits surrounding the central opening.

15. The indexing router base of claim 14,
    further comprising a plurality of clamp assemblies, each clamp assembly of the plurality of clamp assemblies being configured to cooperate with a respective slit of the array of radially oriented slits to clamp a router to the main body.

16. The indexing router base of claim 1, wherein at least a component of a vector of the long axis is parallel to the lower surface.

17. The indexing router base of claim 16, wherein the long axis is parallel to the lower surface.

18. An indexing router base, comprising a main body, wherein the main body comprises:
   an upper surface and a lower surface;
   a central opening through the main body;
   a raised guide ring that protrudes upward from the upper surface and that surrounds the central opening;
   a linear cleat that protrudes downward from the lower surface, that is set apart from a center of the central opening, and that defines a long axis that is perpendicular to a radial line originating at the center of the central opening;
   a dust groove that is recessed into the lower surface and that is oriented parallel to the linear cleat; and
   wherein the central opening opens into the dust groove.

\* \* \* \* \*